United States Patent Office 3,671,325
Patented June 20, 1972

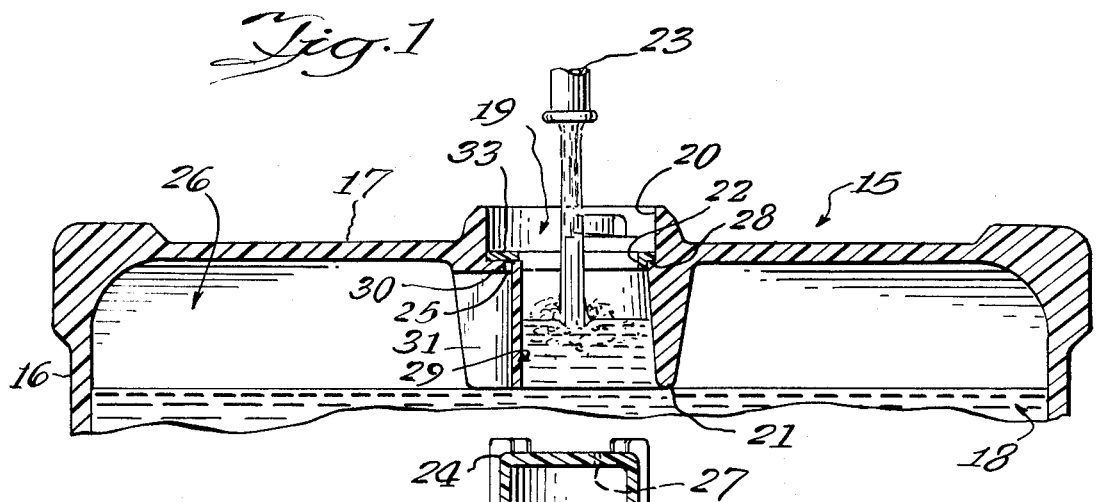
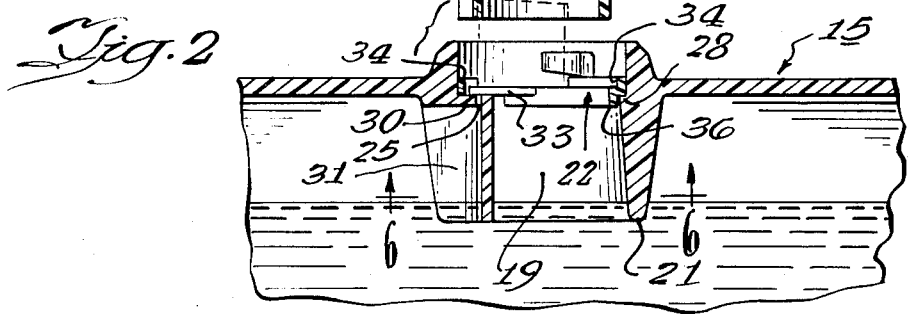
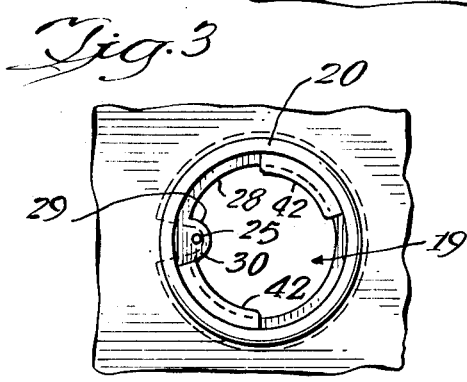
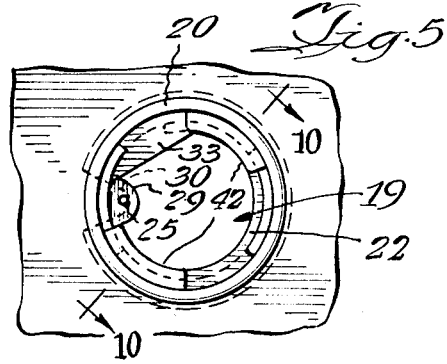
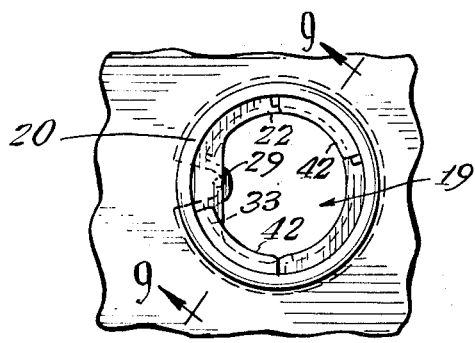
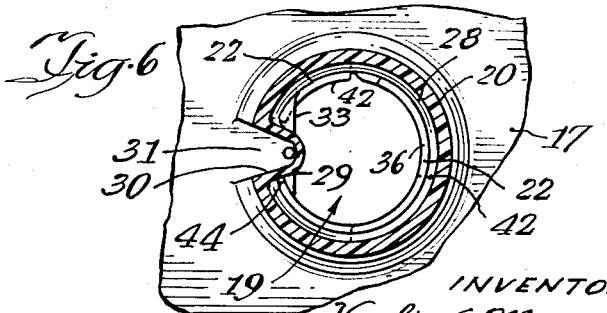

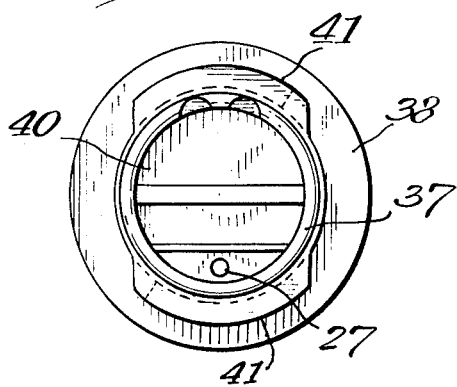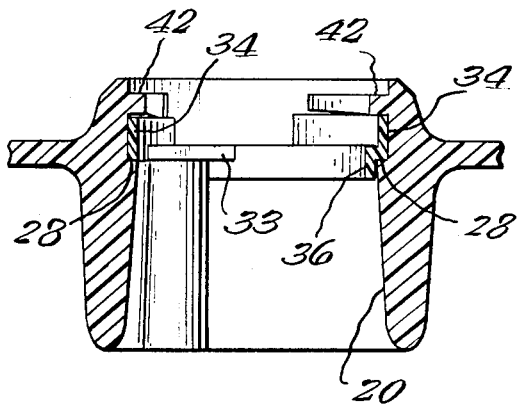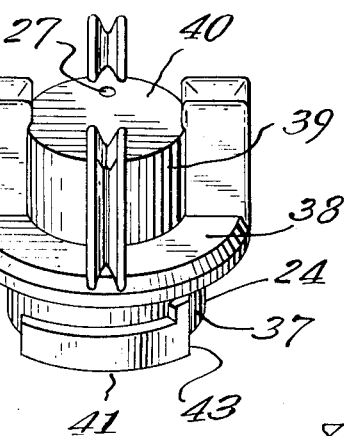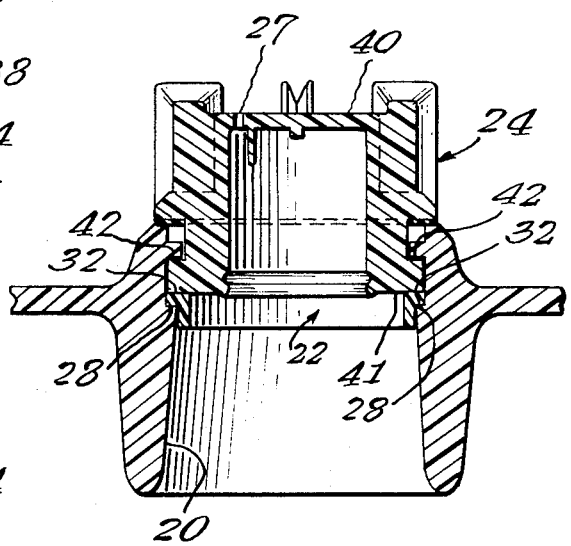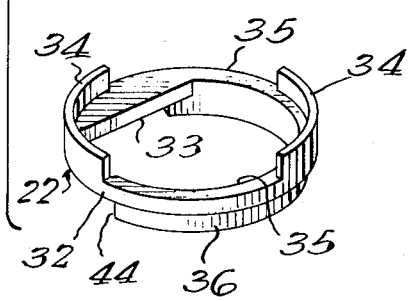

3,671,325
SEALING ASSEMBLY FOR STORAGE BATTERIES
Verlin A. Mocas, Indianapolis, Ind., assignor to The Richardson Company, Melrose Park, Ill.
Filed Apr. 27, 1970, Ser. No. 32,044
Int. Cl. H01m 7/00
U.S. Cl. 136—178
3 Claims

ABSTRACT OF THE DISCLOSURE

A sealing assembly for the cell compartment of an electric storage battery which precludes electrolyte overfilling and comprising a rotatable sealing means mounted on a filling well and cooperable with the cell compartment capping means so as to close the void space within the cell compartment to the atmosphere during filling and open the void space when the capping means close the filling well.

---

This invention relates to an assembly for sealing the filling well opening of a storage battery cell compartment and more particularly relates to an assembly for automatically preventing the overfilling of the cell compartment while adding electrolyte liquid.

Electric storage batteries, particularly those of the lead-acid type, typically consist of a number or series of individual cells. Each cell, composed basically of liquid electrolyte and lead plates, is conventionally contained within a separate cell compartment of a multi-compartmented battery case. Because the cell in electrical operation generates various gases, a void space of suitable volume is maintained above the electrolyte liquid level within the cell compartment. This void space serves to collect the gases prior to their being exhausted to the atmosphere which minimizes any loss of the electrolyte as entrained liquid in the exiting gases. This void space is frequently difficult to maintain, however, particularly when filling or recharging the battery cell with electrolyte liquid.

To supply the required liquid electrolyte to the cell, the cell compartment is equipped with a "filling well" of a generally downwardly extending tubular member which provides an opening into the cell compartment. In filling the cell compartment with the electrolyte, the filling well is first opened by removing a closing cap or plug and then the electrolyte liquid is simply poured through the filling well into the cell compartment. Because the diameter or cross-sectional area of the filling well is typically quite small, it is often exceedingly difficult to carefully observe the level of the electrolyte during the filling operation. Consequently, the first signal that an excessive quantity of liquid has been added is an overflowing of the liquid out of the top of the filling well. Unfortunately, at this liquid level, the battery cell compartment is completely filled or flooded which eliminates the desired void space. Moreover, not only is the void space eliminated by the excessive addition of liquid but when make-up water is added, the desired acid concentration of the electrolyte is adversely affected by excessive dilution. These undesirable consequences resulting from an overfilling of the cell compartment seriously limit the effective operation of the battery cell.

Various devices have been suggested to avoid or prevent the overfilling of battery cell compartments. Most of these involve trapping air within the void space during the filling so as to cause the liquid being added to rise solely and rapidly within the filling well and thus give warning that the filling operation should be terminated. These devices have not proved particularly successful, however, in that they either were too complicated and expensive or due to their simple construction, failed to function properly over lengthy periods with any degree of reliability.

Accordingly, an object of this invention is to provide a sealing assembly for sealing the filling well opening of a battery cell compartment which automatically prevents any over-filling of the cell compartment when adding liquid electrolyte. Another object is to provide such an assembly which is automatic in operation and simple in construction. These and other objects of this invention will be apparent in the following further detailed description thereof as well as from the appended drawings.

In the drawings:

FIG. 1 is a sectional view taken vertically through the upper part of the cell compartment of an electric storage battery showing employment of the assembly of this invention with the vent plug removed from the filling well and a sealing ring in closed position.

FIG. 2 is a sectional view analagous to FIG. 1 and illustrating arrangement of the assembly of this invention when a sealing ring is in an open position and the filling well closed by a vent plug which is illustrated disposed upwardly from the filling well for purposes of clarity.

FIG. 3 is a top view of the filling well of FIG. 1 with the sealing ring removed.

FIG. 4 is a view analagous to FIG. 3 but with the sealing ring inserted and in a closed position sealing a port.

FIG. 5 is another view analagous to FIG. 4 but with the sealing ring in a position opening the port with the vent plug removed for illustrative purposes.

FIG. 6 is a bottom view of the filling well of FIG. 1.

FIG. 7 is an exploded perspective view of a sealing ring and vent plug in a spaced relationship illustrating the mating parts.

FIG. 8 is a bottom view of the vent plug of FIG. 7.

FIG. 9 is a cross-sectional view along a line 9—9 of FIG. 4.

FIG. 10 is a cross-sectional view along the line 10—10 of FIG. 5 as it would appear with a vent plug locked within the filling well.

In general reference to FIG. 1, a battery cell compartment 15 of an electric storage battery is illustrated in cross-section comprising container walls 16 and cover 17 which are joined together to confine and enclose a liquid electrolyte 18. Joined to and passing through the cover 17 is a filling well 19 defined generally by a downwardly extending tubular wall 20 having its lower terminal 21 spaced generally above the desired electrolyte liquid level within the cell compartment 15. Mounted on the tubular wall 20 of the filling well 19 are sealing means represented by a sealing ring 22 more fully illustrated in FIG. 7. The conventional elements of the cell such as the metal plates, connectors, battery cell compartment bottom and terminal posts are omitted from FIG. 1 for convenience.

In operational explanation of the assembly of this invention, FIG. 1 illustrates the filling operation of the battery cell compartment 15 where additional electrolyte liquid 18 comprising usually either water or acid or a combination thereof is poured from a spout 23 directly into the open filling well 19. The conventional filling well capping means, such as the vent plug 24 of FIG. 7 is removed from the filling well 19 for the filling operation. As may be observed from FIG. 1, as the liquid electrolyte 18 is added, the electrolyte liquid level will ultimately reach the lower terminal 21 of the tubular wall 20. This lower terminal 21 of the filling well 19 generally corresponds in elevation to the desired upper liquid electrolyte level for the cell compartment 15.

The only passageways providing exit from the interior of cell compartment 15 to the atmosphere is through the open filling well 19 and a passageway represented by a port 25 extending through the tubular wall 20. As shown in FIG. 1, the port 25 is closed by the sealing ring 22 when the filling well 19 is open to the atmosphere, that is, with the capping means represented by vent plug 24 removed. With the port 25 so closed, the only remaining passageway to the atmosphere from the interior of the cell compartment 15 is through the open filling well 19. However, when the electrolyte liquid level reaches the terminal 21 of the tubular wall 20, a liquid seal is created which traps air within a void space 26 located above the electrolyte level and below the battery cover 17. Consequently, as further liquid is added to the filling well 19, the liquid level can rise only within the filling well 19 inasmuch as the air trapped within the void space 26 will preclude any increase in the liquid level within such void space 26. When the electrolyte liquid level reaches the lower terminal 21 of the tubular wall 20, there will be a rapid rise in the liquid level within the filling well 19 thus giving warning that the cell compartment 15 has received the desired quantity of electrolyte liquid 18. Should the rapid rise of liquid within the filling well 19 fail to give adequate warning, the filling well 19 will ultimately overflow giving a positive indication that the addition of liquid should be terminated. However, even when the filling well 19 overflows, no additional liquid can enter the void space 26 thereby limiting the electrolyte level within the cell compartment 15 to substantially the elevation of the terminal 21 of the tubular wall 20.

When the addition of liquid is terminated, capping means such as the vent plug 24 is replaced within the filling well 19 as illustrated in FIG. 2 to close the filling well 19. In accordance with this invention, as the vent plug 24 is positioned within the filling well 19, it first engages the sealing means as represented by the sealing ring 22 and then when the vent plug 24 is rotated to a locking position to close the filling well 19, the vent plug 24 simultaneously drives and rotates the sealing ring 22 to an angular position which opens the port 25. With the port 25 so open, the air trapped within the void space 26 can now escape to the atmosphere through the hollow interior of the vent plug 24 via a vent 27. The escape of air from the void space 26 permits the liquid within the filling well 18 above the lower terminal 21 of the tubular wall 20 to flow downwardly out of the filling well 19. This will, of course, result in a slight upward adjustment of the height of the electrolyte liquid 18. However, since the volume of liquid within the filling well 19, even when completely full, is quite small compared to the entire volume of the electrolyte within the cell compartment 15, the overall height rise adjustment of the electrolyte liquid is quite small.

In more specific reference to FIGS. 1 to 5, the tubular wall 20 of the filling well 19 is shown preferably equipped with a projection around its inner periphery extending radially inwardly to form a shoulder 28. This shoulder, which may be separate or integral with the tubular wall 20, is adapted to rotatably support the sealing means such as the sealing ring 22. The tubular wall 20 also in one embodiment of this invention has a hollow protuberance 29 which extends radially inwardly and is vertically disposed from the terminal 21 of the tubular side wall 20 to the shoulder 28. This hollow protuberance 29, shown having generally a V-shape, is sealed at its upper portion by an extended conforming area of the shoulder 28 or horizontal shelf 30 and the port 25 is preferably located as shown within the area of the shelf 30. The particular V-shape of the protuberance 29 and the location of the port 25 is best understood with reference to FIGS. 3 and 6 illustrating respectively top and bottom views of the filling well 19 with the sealing ring 22 removed in FIG. 3 and in place in FIG. 6. These particular figures more clearly reveal the shoulder 28, the shelf 30 and the V-shape of the protuberance 29. FIG. 6 illustrates particularly the hollow interior 31 of the protuberance 29 which opens into the interior of the cell compartment 15 or more specifically the void space 26 above the desired electrolyte liquid level as determined by the elevation of the terminal 21 of the tubular wall 20.

Referring to FIG. 7, one appropriate sealing means for closing the passageway providing access to the interior of the cell compartment 15 and represented by port 25 is illustrated by sealing ring 22 which comprises essentially an annular body portion 32 having a sealing segment 33 of generally an arc shape which is integral with and disposed radially inwardly from the annular body portion 32. The sealing ring 22 also for certain embodiments of this invention is shown provided with skirts 34 which extend upwardly from the outer perimeter or circumference of the annular body portion 32. The discontinuous spaces between the skirts 34 define slots 35. As a further preferred embodiment, the sealing ring 22 has another skirt 36 which depends downwardly from the annular body portion 32 and preferably from the inner perimeter or circumference thereof. The particular purposes of the skirts 34 and 36 as well as the slots 35 will be more fully explained hereinafter.

As previously indicated, and again in generally reference to FIGS. 1 to 6, the sealing ring 22 is rotatably supported by the shoulder 28 on the tubular wall 20 specifically with the bottom of the annular body portion 32 resting upon the shoulder 28. When the capping means as represented by vent plug 24 is removed to open the filling well 19, the sealing ring 22 is driven by the rotational action of the vent plug 24 to an annular position where the sealing segment 33 of the sealing ring is positioned directly over the port 25 in a closing relationship. FIG. 4 best illustrates this closing position of the sealing ring 22. With the port 25 so closed, air cannot escape from the void space 26 of the cell compartment 15 during the filling operation. After the filling operation is complete, and during replacement and locking of the vent plug 24 within the filling well 19 to close the filling well 19, the sealing ring 22 is rotated back to an angular position as shown in FIG. 5 where the sealing segment 33 opens the port 25. As described in reference to FIG. 2 with the port 25 so open, air can now escape from the void space 26 to the atmosphere through the hollow interior of the vent plug 24.

The positive action according to the assembly of this invention in opening and closing the port 25 by rotation of the sealing ring 22 in response to the removal and replacement of the vent plug 24, is achieved essentially by providing an interlocking relationship or arrangement between the sealing ring 22 and the vent plug 24. Consequently, as a result of such interlocking relationship, when the vent plug 24 is removed from the filling well to open the filling well 19 for the addition of electrolyte, the sealing ring 22 will positively and automatically be rotated to close the port 25 and when the vent plug 24 is replaced and locked within the filling well 19, the sealing ring 22 will similarly automatically be rotated to open the port 25. This interlocking arrangement according to the assembly of this invention is moreover achieved without causing any operational difficulties in either removing or replacing the vent plug 24 within the filling well 19 according to conventional procedures.

One suitable capping means which will form the desired interlocking relationship with the sealing ring 22 is provided by the hollow vent plug 24 as illustrated in FIG. 7. This vent plug 24 is of conventional unitary construction and suitably comprises a downwardly extending tubular wall portion 37, a flange ring portion 38, such flange portion extending horizontally outwardly from the tubular wall portion 37 and adapted to seat in flange fashion over the top of the filling well 19. This vent plug 24 is further provided with a hand-gripping tubular wall portion 39 integral with and extending upwardly from the flange ring portion 38, such tubular wall 39 being closed by a top 40. The vent 27 extends through the top 40 and provides communication via the hollow interior of the vent plug 24 between the atmosphere and the filling well 19. So that air may freely pass out of the port 25 and upwardly through the hollow portion of the vent plug 24 to the atmosphere via the vent 27, the downwardly extending tubular wall portion 37 of the vent plug 24 is designed to terminate slightly above the shoulder 28 when the vent plug 24 is positioned within the filling well 19. This downward extending tubular wall 37 of the vent plug 24, as best illustrated in FIGS. 7 and 8, is also suitably provided with ribs 41 which extend radially outwardly from the tubular wall 37. These ribs 41 serve both to securely lock the vent plug 24 in a closed position within the filling well 19 and also to engage the sealing ring 22 in the desired interlocking relationship so as to rotatably drive the sealing ring 22 when the vent plug 24 is rotated either to open or close the filling well 19.

So that the sealing ring 22 can suitably mate with the vent plug 24 in the desired interlocking relationship, the slots 35 defined by the discontinued skirts 34 of the sealing ring 22 are so designed that they can freely receive the ribs 41. This relationship may be best understood with reference to FIG. 7 which illustrates in perspective the spacial relationship between the slots 35 and the ribs 41. Thus, when the vent plug 24 is downwardly placed into the filling well 19 so that the ribs 41 mate with the slots 35, any rotation of the vent plug 24 will produce a corresponding rotation of the sealing ring 22.

For purposes of achieving positive locking of the vent plug 24 within the filling well 19 and also to provide guidance for the proper mating alignment of the ribs 41 with the slots 35 when the vent plug 24 is inserted into the filling well 19, the tubular wall 20 of the filling well 19 is equipped with baffles 42. These baffles, as shown in FIGS. 3 to 6, extend radially inwardly from the tubular wall 20 and are so positioned circumferentially on the tubular wall 20 that the baffles 42 bar or preclude insertion of the vent plug 24 into the filling well 19 in any angular position other than one where the ribs 41 of the vent plug 24 will properly align with the slots 35 of the sealing ring 22. These baffles 42 are further arranged both in their angular position and elevation on the tubular wall 20 above the shoulder 28 and in reference to the thickness of the ribs 41 so that when the vent plug 24 is rotated, the ribs 41 will securely lock in bayonet fashion as shown in FIG. 10 between the baffles 42 and the annular body portion 32 of the sealing ring 22 as supported on the shoulder 28.

The distance between the baffles 42 and the annular body portion 32 as supported on the shoulder 28 is further adjusted in respect to the height or thickness of the ribs 41 so that the ribs 41 cannot completely pass under the baffles 42. This will prevent the vent plug 24 and hence the sealing ring 22 from being rotated out of the desired angular position where the port 25 is open when the vent plug 24 is locked in place to close the filling well 19. For example, in reference to FIGS. 4 and 5, when the vent plug 24 (not shown in such figures) is inserted into the filling well 19 and rotated in a clockwise direction to close the filling well 19, the ribs 41 will only pass part way underneath the baffles 42. This stops the vent plug 24 and hence the sealing ring 22 in the desired annular position as shown in FIG. 5 where the sealing segment 33 opens the port 25. Such stopping is positively assured by adjusting the height of the ends 43 of the ribs 41 (FIG. 7) so that such ends cannot pass under the baffles 42. Then to open the filling well 19 by removing the vent plug 24, the vent plug 24 is rotated back in a counterclockwise direction until the ribs 41 are completely disengaged from beneath the baffles 42. This counterclockwise rotation of the vent plug 24 will rotate the sealing ring 22 back to the angular position as illustrated in FIG. 4 where the sealing segment 33 once again closes the port 25. To provide an automatic stop when turning the vent plug 24 in opening the filling well 19 and to assure that the sealing segment 33 is positively positioned over the port 25 as shown in FIG. 4, the downwardly depending skirt 36 of the sealing ring 22 is arranged on the annular body portion 32 in reference to the sealing segment 33 so that one vertical end edge 44 contacts the protuberance 29 as best shown in FIG. 6. The end edge 44 thus precludes any further rotation of the sealing ring 22 and hence also the vent plug 24. In such position, the ribs 41 of the vent plug 24 do not contact the baffles 42 and consequently the vent plug 24 may then be freely lifted out of the filling well 19.

When the sealing ring 22 is positioned with the sealing segment 33 closing the port 25, as shown in FIG. 4, a positive downward pressure of the sealing segment 33 over the port 25 is assured by suitable dimensioning of the upward extending skirts 34. As best illustrated in FIG. 9, when the filling well 19 is open with the vent plug 24 removed, the upward extending skirts 34 are generally positioned beneath the baffles 42. Thus by extending the height of the skirts 34 a distance sufficient to pressure lock beneath the baffles 42, a downward positive pressure will be exerted upon the entire sealing ring 22 which will assure a positive airtight seal of the sealing segment 33 over the port 25.

The construction and fabrication of the various components of the assembly of this invention are generally in accordance with established procedures for manufacturing storage batteries. For example, the filling well 19 defined by the tubular wall 20 and the sealing ring 22 can be of the same or different material such as hard rubber of polyolefins, for example, polypropylene. The fabrication of the assembly can proceed according to conventional practices with the filling well 19 and its shoulder 28, baffles 42, and protuberance 29 being molded in one piece as a unitary part of the battery cell cover 17. The sealing ring 22 can be separately molded and then simply temporarily deformed during pressure insertion into place within the filling well 19 between the shoulder 28 and baffles 42.

I claim:

1. A sealing assembly for the cell compartment of a storage battery comprising in combination a filling well defined by a tubular wall extending downwardly into the interior of the cell compartment, a shoulder horizontally disposed around the inner periphery of said tubular wall having a vertically extending port providing communication between the atmosphere and the interior of said cell, a cylindrical capping means for said filling well provided with a vent, a plurality of circumferentially spaced ribs extending radially from the outer periphery of said capping means, a sealing ring having an annular body portion supported by the shoulder and equipped with a sealing segment integral with and inwardly disposed radially from the annular body portion which is adapted to open and close the port upon rotation of the sealing ring, a plurality of radially extending baffles circumferentially spaced around the inner periphery of said tubular wall above said shoulder, said baffles being so disposed at a vertical position on said tubular wall as to permit the ribs of said capping means to pass beneath the baffles when said capping means is rotated to thereby fix said capping means in a closed position, said sealing ring being further provided with a skirt extending upwardly from its outer periphery having a plurality of circumferentially spaced slots complementary to and adapted to receive the ribs disposed on the periphery of said capping means to interlock said capping means and said sealing ring and permit the simultaneous rotation of the two members.

2. The assembly of claim 1 wherein the tubular wall of the filling well has a hollow protuberance extending radially inwardly and vertically disposed from the lower terminal of the tubular wall to the shoulder, the hollow portion of such protuberance opening into the interior of the cell compartment and the port through the shoulder provides communication between the atmosphere and the hollow portion of the protuberance.

3. The assembly of claim 2 wherein the sealing ring has a skirt depending downwardly from the inner perimeter of the annular body portion, such depending skirt being discontinuous around the circumference of the annular body portion and forming at least one discontinuous section defined by two vertical end edges of the skirt, such discontinuous section being adjusted in relation both to the sealing segment of the sealing ring and the protuberance of the tubular wall so that when the capping means are rotated in opening the filling well, one of the end vertical edges of the depending skirt will contact the protuberance and thereby providing a positive stop for the sealing ring in a position where the sealing segment closes the port.

References Cited
UNITED STATES PATENTS

| | | | |
|---|---|---|---|
| 1,163,993 | 12/1915 | Ford | 136—178 |
| 2,330,669 | 9/1943 | Biles | 136—178 |
| 2,276,092 | 3/1942 | Reppert et al. | 136—178 |
| 2,259,158 | 10/1941 | Flikkie | 136—178 |
| 2,201,275 | 5/1940 | Slusher | 136—178 |
| 2,240,733 | 5/1941 | Woodbridge | 136—178 |

DONALD L. WALTON, Primary Examiner

U.S. Cl. X.R.

136—182